United States Patent
Fan et al.

(10) Patent No.: US 10,742,777 B2
(45) Date of Patent: Aug. 11, 2020

(54) UDP PROTOCOL ACCELERATION METHOD AND SYSTEM

(71) Applicant: WANGSU SCIENCE & TECHNOLOGY CO., LTD., Shanghai (CN)

(72) Inventors: Zidao Fan, Shanghai (CN); Ming Zheng, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 106 days.

(21) Appl. No.: 16/061,265

(22) PCT Filed: Nov. 16, 2016

(86) PCT No.: PCT/CN2016/106055
§ 371 (c)(1),
(2) Date: Jun. 11, 2018

(87) PCT Pub. No.: WO2017/185719
PCT Pub. Date: Nov. 2, 2017

(65) Prior Publication Data
US 2018/0367648 A1    Dec. 20, 2018

(30) Foreign Application Priority Data
Apr. 25, 2016 (CN) .......................... 2016 1 0261388

(51) Int. Cl.
*G06F 15/173* (2006.01)
*H04L 29/06* (2006.01)
(Continued)

(52) U.S. Cl.
CPC .......... *H04L 69/164* (2013.01); *H04L 45/745* (2013.01); *H04L 67/141* (2013.01);
(Continued)

(58) Field of Classification Search
CPC . H04L 63/10; H04L 63/0227; H04L 63/0236; H04L 63/0281; H04L 67/2804
See application file for complete search history.

(56) References Cited

U.S. PATENT DOCUMENTS 6,609,159 B1 *  8/2003  Dukach ................ G06F 9/5033
                                                    709/203
9,258,335 B1    2/2016  Taylor et al.
(Continued)

FOREIGN PATENT DOCUMENTS

CN    102244645 A    11/2011
CN    102571928 A     7/2012
(Continued)

OTHER PUBLICATIONS

The World Intellectual Property Organization (WIPO) International Search Report for PCT/CN2016/106055 dated Jan. 25, 2017 6 Pages.
(Continued)

*Primary Examiner* — Yves Dalencourt
(74) *Attorney, Agent, or Firm* — Anova Law Group, PLLC

(57) ABSTRACT

A UDP protocol acceleration system includes a client terminal, an acceleration server, and a source station. The client terminal includes a local proxy at the application layer and one or more local applications to be accelerated, and a network filter at the IP layer. The local proxy identifies redirection requests from different local applications among requests received and, for each redirection request, queries an original destination address, and encapsulates and sends the original destination address and the redirection request to the acceleration server. The acceleration server parses the original destination, acts as a proxy for the redirection request, and sends a response back to the local proxy. The local proxy, after receiving the response from the acceleration server, queries acceleration records, and forwards the response to a corresponding local application.

10 Claims, 1 Drawing Sheet

(51) Int. Cl.
    *H04L 29/08*        (2006.01)
    *H04L 12/741*       (2013.01)
(52) U.S. Cl.
    CPC ............ *H04L 67/28* (2013.01); *H04L 67/289* (2013.01); *H04L 69/22* (2013.01); *H04L 69/321* (2013.01)

(56) References Cited

U.S. PATENT DOCUMENTS

| | | | |
|---|---|---|---|
| 2003/0053448 A1* | 3/2003 | Craig | ................. H04L 67/2814 370/353 |
| 2008/0059644 A1 | 3/2008 | Bakke et al. | |
| 2010/0011116 A1 | 1/2010 | Thornton et al. | |
| 2015/0139236 A1* | 5/2015 | Chadda | ............... H04L 63/0227 370/392 |

FOREIGN PATENT DOCUMENTS

| | | | |
|---|---|---|---|
| CN | 103916405 | A | 7/2014 |
| CN | 105072057 | A | 11/2015 |
| CN | 105516262 | A | 4/2016 |
| CN | 105791315 | A | 7/2016 |
| EP | 3422656 | A1 | 1/2019 |
| WO | 2011005394 | A2 | 1/2011 |

OTHER PUBLICATIONS

The European Patent Office (EPO) The Extended European Search Report for 16900226.8 (PCT/CN2016/106055) Feb. 11, 2019 11 Pages.

\* cited by examiner

US 10,742,777 B2

UDP PROTOCOL ACCELERATION METHOD AND SYSTEM

CROSS-REFERENCES TO RELATED APPLICATIONS

This patent application is a national phase entry under 35 U.S.C § 371 of PCT Application No. PCT/CN2016/106055, filed on Nov. 16, 2016, which claims priority of Chinese patent application No. 201610261388.X, filed on Apr. 25, 2016, the entire content of all of which is incorporated herein by reference.

FIELD OF THE DISCLOSURE

The present disclosure generally relates to user datagram protocol (UDP protocol) and, in particular, to a UDP protocol traffic acceleration method and system.

BACKGROUND

The UDP protocol is a connectionless protocol in the open system interconnection OSI reference model. It is in the fourth layer, the transport layer, and is the upper layer of the IP protocol. It is used to process data packets, mainly to compress network data traffic in the form of data packets, providing a simple transaction-oriented information delivery service. It does not provide packet grouping or assembling, nor can it reorder data packets.

According to the present disclosure, the UDP protocol acceleration is usually divided into two stages. At the first stage, the UDP protocol traffic is directed to a remote acceleration server and, at the second stage, the acceleration server acts as a proxy for the UDP traffic. The common practice at the first stage is to redirect the UDP protocol traffic to a local proxy, and the local proxy encapsulates and forwards the UDP packets to the remote acceleration server. In order for the acceleration server to properly act as the proxy for the UDP traffic, the local proxy needs to send the data packet and its original destination address to the acceleration server. Since UDP is connectionless, when the packet is redirected to the local proxy, the original destination address cannot be obtained in the user mode through the existing socket function.

Currently, the specific method for accelerating the UDP protocol traffic passing through the router is to redirect the traffic to the local proxy by setting rules in the Iptables in the router, and to obtain the original destination address of the UDP packet in the local proxy through the Linux transparent proxy TPROXY module. The local proxy forwards the packet and original destination address information to the acceleration server. Because the TPROXY module operates in the pre-route PREROUTING link of the network filter Netfilter, while the traffic generated by local applications does not pass through the PREROUTING link, this scheme cannot accelerate the UDP packets generated by local applications.

On the other hand, although routers can accelerate the traffic that flows through routers, the routers cannot differentiate the traffic of different terminals. For example, set-top boxes, mobile phones, and other terminal devices all access acceleration routers, and routers cannot distinguish the traffic of different terminal devices. Therefore, the acceleration function needs to be installed in the terminals.

BRIEF SUMMARY OF THE DISCLOSURE

This summary is provided to introduce in a simplified form certain concepts that are further described below in the Detailed Description. This summary is not intended to exclusively identify key features or essential features of the claimed subject matter, nor is it intended to be used as an aid in determining the scope of the claimed subject matter.

The invention solves the problem of correctly obtaining the original destination address of the data packet after the UDP data packet is redirected to the local proxy during the acceleration process of UDP protocol traffic generated by local applications, thereby realizing the acceleration of the local UDP protocol traffic in the client terminal.

A UDP protocol acceleration method of the present invention includes: obtaining, by a local proxy in a client terminal, a source address of a request from a local application; querying a connection information table of an operating system of the client terminal to obtain an original destination address; encapsulating and sending the original destination address and the request to an acceleration server through an acceleration socket; acting as a proxy, by the acceleration server, for the client terminal to process the request; and receiving, by the local proxy, a response from the acceleration server, and forwarding the response to the local application.

A UDP protocol acceleration system of the present invention includes: a client terminal having a local proxy, one or more local applications to be accelerated, and a Netfilter at an IP layer; and an acceleration server. The local proxy identifies redirection requests from different local applications among requests received; for each redirection request, queries an original destination address, and encapsulates and sends the original destination and the redirection request to the acceleration server. The acceleration server parses out the original destination address, acts as a proxy for the redirection request, and sends a response back to the local proxy. The local proxy, after receiving the response from the acceleration server, queries acceleration records, and forwards the response to a corresponding local application.

DETAILED DESCRIPTION

According to the present invention, after the redirection of local UDP protocol data packet, the destination address can be obtained correctly, which makes it possible to accelerate the UDP protocol traffic generated by local applications in the client terminal.

According to an embodiment of the invention, data traffic is directed to the local proxy through Iptables. The local proxy obtains the original destination address of the UDP protocol data packet and directs the data traffic in the application layer. The acceleration scheme does not change the Linux Netfilter, TCP/IC protocol stack, and other key modules.

Figure 1:
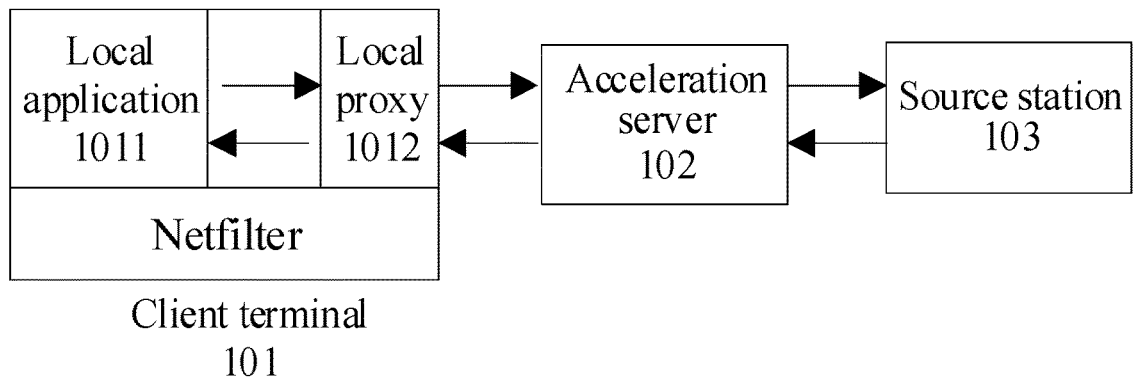
FIG. 1 is a schematic structural diagram of a system for implementing the present invention.

Referring to FIG. 1, a schematic diagram of a system is shown for implementing the present invention. The system includes a client terminal 101, an acceleration server 102, and a source station 103. The client terminal 101 comprises a local proxy 1012, and one or more local applications 1011 that are to be accelerated, and both local proxy 1012 and local applications 1011 are in the application layer. The Netfilter contained in the client terminal 101 is in the IP layer, and it can redirect requests from local applications 1011 to the local proxy 1012. The local proxy 1012 processes the redirection requests, identifies the redirection requests from different local applications, queries the original destination addresses, and encapsulates and sends the original destination address and the request to the acceleration server 102. In the meantime, the local proxy 1012 also saves the acceleration records. The acceleration server 102 parses out the original destination address, acts as a proxy for the local proxy 1012 to send out requests to the source station 103, and then returns the response back to the local proxy 1012. After the local proxy 1012 receives the response packet from the acceleration server 102, it queries the previously saved acceleration records, and forwards the response to a corresponding local application 1011 according to the acceleration records.

Figure 2:
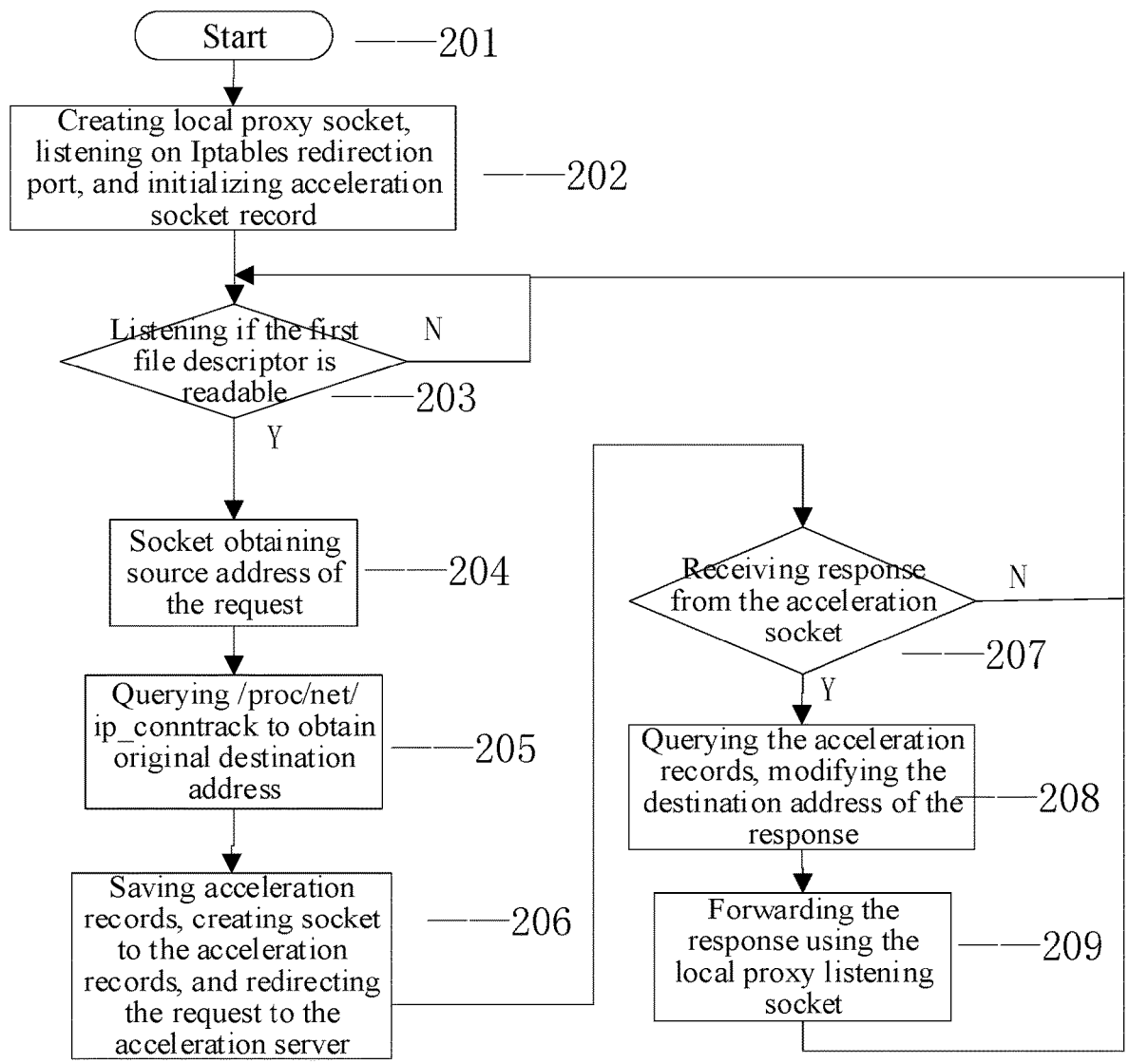
FIG. 2 is a flow chart of an operation process of a local proxy module according to the present invention.

Now referring to FIG. 2, FIG. 2 shows an operation process of the local proxy module according to a UDP protocol acceleration method of the present invention.

The method starts from Step 201.

In Step 202, a listening socket is created for the local proxy, and the function of the listening socket is to process a request which is redirected from an application on the client terminal to the local proxy. The listening socket is associated with a first file descriptor.

In Step 203, the listening socket listens to the first file descriptor to determine whether the first file descriptor is readable. If it is readable, it indicates that a request from a local application has been redirected to the local proxy's listening port, therefore the local proxy can receive the redirected request and proceed to the acceleration process, and then proceeds to Step 204. If it is not readable, the process goes back to Step 203 to continue listening.

In Step 204, the local proxy obtains through an API interface the source address src_ip, src_port of the request; and, in Step 205, the local proxy queries the connection information table/proc/net/ip_conntrack based on the obtained source address src_ip, src_port of the request, to obtain the original destination address dst_ip, dst_port. Further, in Step 206, the local proxy creates an acceleration socket to communicate with the remote acceleration server and, in the meantime, information about the acceleration socket and its associated second file desciptor, the source address src_ip, src_port of the request, and the original destination address dst_ip, dst_port are saved in the local proxy's acceleration records, such that any received response can be sent back to the corresponding local application. The local proxy encapsulates and sends the original destination address dst_ip, dst_port and the request to the acceleration server through the acceleration socket.

In Step 207, the system determines if the acceleration socket has received a response to the request. If the response has not been received, the process returns to Step 203; if the response has been received, the acceleration records are queried at Step 208. Based on the acceleration record, the source address src_ip, src_port of the request is obtained, and the destination address of the response is modified to the source address src_ip, src_port. In Step 209, the response is forwarded to the source address src_ip, src_port of the request through the local proxy listening socket.

After Step 209, the entire process returns to Step 203 and continues listening.

In the process, the Step 205, based on the source address src_ip, src_port of the request, obtaining the original destination address through querying the connection information table /proc/net/ip_conntrack may include following steps.

The Linux kernel uses the ip_conntrack structure to record the status of the network data packets that enter the netfilter, and saves the status information in /proc/net/ip_conntrack.

The recording format of UDP protocol in /proc/net/ip_conntrack is listed below:
   udp 17 21 src=192.168.1.121 dst=27.152.87.177
   sport=35779 dport=6666 [UNREPLIED]
   src=127.0.0.1 dst=192.168.1.121
   sport=8122 dport=35779 mark=0 use=2

Where the meaning of main fields are as follows:

The third field represents the keep-alive time, unit is second;

The fourth, fifth, sixth and seventh fields represent the information of tuple [ORIGINAL] before entering the netfilter (the turple information before the request is redirected), which is the information of the original UDP data packet;

The eighth field represents the UDP data packet status, [UNREPLIED] indicates that the server has not responded to the client, this field does not exist if a response is processed;

The ninth, tenth, eleventh, and twelfth fields represent the information of tuple [REPLY] (the tuple information after the request is redirected), which is the information of the redirected UDP data packet.

The local proxy obtains the tuple [REPLY] information in the /proc/net/ip_conntrack table that corresponds the UDP data tuple and, based on this information to find the tuple [ORIGINAL] information. Thus, the original destination address can be obtained.

According to an embodiment of the invention, when a client terminal uses the same socket (fixed ip, port) to send the UDP data to multiple different destination addresses, the UDP data tuple redirected by iptables and received by the local proxy is unique. The /proc/net/ip_conntrack table can still be queried for the uniquely matching record to obtain the accurate original destination address. The reason is that the records of /proc/net/ip_conntrack are generated based on the tuple [ORIGINAL] of the UDP data packets. If there is any different element in the tuple [ORIGINAL], it generates a new record. Even though this example uses the same socket, the original destination addresses are different, therefore there are multiple records being generated.

According to the above methods of the present invention, once the local proxy obtains the original destination address of the UDP packets correctly, the local proxy forwards the data packets and original destination address information to the remote acceleration server, achieving the acceleration of the local UDP protocol.

A detailed description of the embodiments of the present invention have been provided to describe the technology of the present invention. The embodiments are provided in the form of examples and are not intended to limit the scope of the invention. The described embodiments may include various features, not all of which are required for all embodiments of the present invention. The embodiments of the present invention only use some of these features or the possible combinations of these features. Those skilled in the art can understand the variations of the disclosed embodiments of the present invention, and embodiments of various combinations of the described features in different disclosed embodiments. The scope of the present invention is intended to be limited only by the claims, and the claims are intended to be interpreted to include all such variations and combinations.

What is claimed is:

1. A UDP protocol acceleration method, comprising:
obtaining, by a local proxy in a client terminal, a source address of a UDP protocol request from a local application within the client terminal;
querying, by the local proxy, a connection information table of an operating system of the client terminal to obtain an original destination address based on the obtained source address of the UDP protocol request;
encapsulating and sending, by the local proxy, the original destination address and the UDP protocol request to an acceleration server through an acceleration socket, the acceleration server being a remote acceleration server located remotely from the client terminal;
parsing out, by the acceleration server, the original destination address, acting as a proxy for the local proxy, to send out the UDP protocol request to a source station corresponding to the original destination address, and returning a response from the source station back to the local proxy; and
receiving, by the local proxy, the response from the acceleration server, and forwarding the response to the local application.

2. The method according to claim 1, wherein the querying a connection information table of an operating system of the client terminal to obtain an original destination address further comprises:
using tuple information of the UDP protocol request received by the local proxy to query the connection information table; and
based on the tuple information after the UDP protocol request is redirected, querying the tuple information before the UDP protocol request is redirected to obtain the original destination address.

3. The method according to claim 1, wherein:
information about the UDP protocol request, and connection information between the local proxy and the acceleration server are stored in the local proxy; and
after receiving the response from the acceleration server, based on the information about the UDP protocol request, and the connection information between the local proxy and the acceleration server, the local proxy forwards the response to the local application.

4. The method according to claim 1, wherein before obtaining, by a local proxy in a client terminal, a source address of a UDP protocol request from a local application, the method further comprises:
creating a listening socket for the local proxy, wherein a function of the listening port is to process requests redirected from one or more local applications to the local proxy, and the listening socket is associated with a first file descriptor;
listening on the first file descriptor, by the listening socket, to determine whether the first file descriptor is readable; and
in response to the first file descriptor being readable, determining that the UDP protocol request is redirected from the local application to the local proxy and the local proxy can proceed to an acceleration process.

5. The method according to claim 4, wherein:
in response to the first file descriptor not being readable, the listing socket continues listening on the first file descriptor.

6. The method according to claim 1, wherein the encapsulating and sending the original destination address and the UDP protocol request to an acceleration server through an acceleration socket further includes:
creating, by the local proxy, the acceleration socket to communicate with the acceleration server; and
storing information about the acceleration socket and an associated second file descriptor, the source address of the UDP protocol request, and the original destination address in acceleration records of the local proxy.

7. The method according to claim 6, wherein the receiving, by the local proxy, a response from the acceleration server, and forwarding the response to the local application further includes:
querying the acceleration records to obtain the source address of the UDP protocol request; and
using the source address of the UDP protocol request as a destination address of the response to forward the response to the local application.

8. A UDP protocol acceleration system, comprising:
a client terminal having a local proxy, one or more local applications to be accelerated, and a Netfilter at an IP layer; and
an acceleration server,
wherein:
the local proxy of the client terminal identifies UDP protocol requests from different local applications among requests received; for each UDP protocol request from a local application in the client terminal, queries an original destination address, and encapsulates and sends the original destination address and the UDP protocol request to the acceleration server through an acceleration socket, the acceleration server being a remote acceleration server located remotely from the client terminal,
the acceleration server parses out the original destination address, acts as a proxy of the local proxy to send out the UDP protocol request to a source station corresponding to the original destination address, and sends a response from the source station back to the local proxy, and
the local proxy, after receiving the response from the acceleration server, queries acceleration records to obtain a source address of the UDP protocol request, and forwards the response to a corresponding local application according to the source address of the UDP protocol request.

9. The system according to claim 8, wherein:
the local proxy is further configured to create an acceleration socket to communicate with the acceleration server, wherein the acceleration socket is associated with a second file descriptor; and
the local proxy stores information about the acceleration socket and the associated second file descriptor, and the source address and the original destination addresses for each UDP protocol request in acceleration records.

10. The system according to claim 8, wherein:
the local proxy queries a connection information table based on the source address of the UDP protocol request to obtain the original destination address of the UDP protocol request.

* * * * *